United States Patent
Norin et al.

(10) Patent No.: US 8,243,923 B2
(45) Date of Patent: Aug. 14, 2012

(54) METHOD AND SYSTEM FOR PROVIDING A PREDEACTIVATION WARNING IN A SYSTEM HAVING A CONDITIONAL ACCESS AUTHORIZATION EXPIRATION IN A MOBILE RECEIVING DEVICE

(75) Inventors: John Norin, Hawthorne, CA (US); Peter M. Klauss, Torrance, CA (US); Scott Casavant, Germantown, MD (US); Jorge Guzman, Gaithersburg, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 1642 days.

(21) Appl. No.: 11/638,202

(22) Filed: Dec. 13, 2006

(65) Prior Publication Data

US 2008/0148361 A1 Jun. 19, 2008

(51) Int. Cl.
*H04L 29/06* (2006.01)
*G06F 15/16* (2006.01)

(52) U.S. Cl. .......... 380/212; 726/4; 705/44; 725/86; 725/87; 725/62; 725/63; 709/201; 709/231

(58) Field of Classification Search .......... None
See application file for complete search history.

(56) References Cited

U.S. PATENT DOCUMENTS

| | | | | |
|---|---|---|---|---|
| 5,892,900 A * | 4/1999 | Ginter et al. | | 726/26 |
| 6,259,891 B1 | 7/2001 | Allen | | |
| 6,721,958 B1 * | 4/2004 | Dureau | | 725/136 |
| 7,945,614 B2 * | 5/2011 | Ebata et al. | | 709/203 |
| 2002/0002542 A1 * | 1/2002 | Ando et al. | | 705/57 |
| 2002/0004906 A1 * | 1/2002 | Rajasekharan et al. | | 713/200 |
| 2002/0152395 A1 * | 10/2002 | Zhang et al. | | 713/200 |
| 2003/0097655 A1 * | 5/2003 | Novak | | 725/31 |
| 2003/0202661 A1 * | 10/2003 | Rodriguez et al. | | 380/239 |
| 2004/0153767 A1 * | 8/2004 | Dolgonos | | 714/18 |
| 2004/0240840 A1 * | 12/2004 | Ledermann et al. | | 386/46 |
| 2005/0034171 A1 * | 2/2005 | Benya | | 725/143 |
| 2005/0068915 A1 | 3/2005 | Atad et al. | | |
| 2005/0193015 A1 * | 9/2005 | Logston et al. | | 707/104.1 |
| 2006/0004675 A1 * | 1/2006 | Bennett et al. | | 705/402 |
| 2006/0064443 A1 * | 3/2006 | Duval | | 707/202 |
| 2006/0128418 A1 | 6/2006 | Quelle et al. | | |

(Continued)

FOREIGN PATENT DOCUMENTS

EP 1530339 * 5/2005

(Continued)

OTHER PUBLICATIONS

International Search Report and Written Opinion dated May 9, 2008 in International counterpart Application No. PCT/US2007/023355 corresponding to U.S. Appl. No. 11/593,710, filed Nov. 7, 2006 by John Norin et al.

(Continued)

*Primary Examiner* — Syed A. Zia
*Assistant Examiner* — Trang Doan (57) ABSTRACT

A system and method for providing conditional access authorizations in a satellite-receiving system includes generating a conditional access authorization signal and an expiration signal at a head-end 20, receiving the conditional access authorization signal at a fixed satellite receiver 54 or at a mobile satellite receiver 28. When the mobile satellite receiver operates in a predetermined time window before the expiration time, which is determined from the expiration signal, a warning 434 on a screen display 432 is generated.

10 Claims, 7 Drawing Sheets

U.S. PATENT DOCUMENTS

| | | | |
|---|---|---|---|
| 2006/0294594 A1* | 12/2006 | Andreaux et al. | 726/26 |
| 2007/0001852 A1* | 1/2007 | Jalkanen et al. | 340/572.1 |
| 2007/0023506 A1* | 2/2007 | Lagadec et al. | 235/382 |
| 2007/0033419 A1* | 2/2007 | Kocher et al. | 713/193 |
| 2007/0061580 A1* | 3/2007 | Venkatesan et al. | 713/176 |
| 2007/0061875 A1* | 3/2007 | Le Buhan et al. | 726/10 |
| 2007/0294170 A1* | 12/2007 | Vantalon et al. | 705/50 |
| 2008/0098442 A1* | 4/2008 | Greenbaum | 725/86 |

FOREIGN PATENT DOCUMENTS

| | | |
|---|---|---|
| EP | 1530339 A1 * | 5/2005 |
| GB | 2387090 A | 10/2003 |
| GB | 2407738 | 5/2005 |
| WO | 0143364 | 6/2001 |

OTHER PUBLICATIONS

DaimlerChrysler; "DaimlerChrysler IT Cruiser Telematics Concept"; Internet citation; retrieved from the internet: URL:http://java.sun.com/products/consumer-embedded/automotive/whitepapers/ITCruiser-Whitepaper.pdf; Jan. 2001; pp. 1-11; XP002271676.

International Search Report and Written Opinion dated May 16, 2008 in International counterpart Application No. PCT/US2007/023361 corresponding to U.S. Appl. No. 11/593,712, filed Nov. 7, 2006 by John Norin et al.

International Search Report and Written Opinion dated Aug. 11, 2008 in International counterpart application No. PCT/US2007/023363 corresponding to U.S. Appl. No. 11/595,394, filed Nov. 10, 2006 by Scott Casavant et al.

* cited by examiner

METHOD AND SYSTEM FOR PROVIDING A PREDEACTIVATION WARNING IN A SYSTEM HAVING A CONDITIONAL ACCESS AUTHORIZATION EXPIRATION IN A MOBILE RECEIVING DEVICE

TECHNICAL FIELD

The present disclosure relates generally to a mobile satellite receiving devices, and, more specifically, to a method and system to provide a warning before conditional access authorization expires in a mobile receiving device.

BACKGROUND

Satellite television has become increasingly popular due to its wide variety of programming. Entertainment in automobiles such as DVD players has also become increasingly popular. It would be desirable to provide a satellite television system for a vehicle so that the wide variety of programming may be enjoyed by the rear passengers.

Typical satellite systems include a receiving device that is used to receive satellite signals from the satellites and convert them to a usable format for playback on a television or monitor. Conditional access in conventional home-based systems is granted via a satellite transmission or through a telephone wire coupled to the satellite receiving device. Conditional access packets (CAPs) grant the user rights to view the satellite signal content. The authorization signals expire after a time period and must again be received to continue viewing or using the satellite signals.

In current stationary DIRECTV systems conditional access authorization is granted for a predetermined amount of time and then extended by a reauthorization signal sometimes referred to as reauthorization CAPs. Because the system is always connected the reauthorization CAP is received before the authorization expires. In a mobile device, the system will be powered up and down. The power down period may be significant and thus the reauthorization CAPs may be missed.

It would therefore be desirable to provide a system and method for allowing a warning to the user of the nearing expiration of the conditional access authorization for a mobile receiving device.

SUMMARY

One feature of the disclosure sets forth a method that includes communicating a conditional access authorization signal and an expiration signal to a mobile playback device. The expiration signal may include a date and time of expiration. The method further includes storing the conditional access authorization signal and the expiration signal in a mobile satellite receiver, enabling the use of the satellite signal by the mobile satellite receiver in response to the conditional access authorization signal and, when the expiration signal is within a time window from an expiration time, generating a screen display corresponding to a reauthorization warning.

In a further aspect of the invention a method includes communicating a conditional access authorization signal and an expiration signal to a mobile playback device, storing the conditional access authorization signal and the expiration signal in a mobile satellite receiver, enabling the use of the satellite signals by the mobile receiver in response to the conditional access authorization signal, when the current time is within a time window from an expiration time, generating a screen display corresponding to a reauthorization warning, contacting a business center, providing identifying information to the business center, communicating a reauthorization signal and a second expiration signal to the mobile receiving device, storing the reauthorization signal and the second expiration signal in the mobile satellite receiver and, enabling use of the satellite signals by the mobile receiver in response to the reauthorization signal and the second expiration signal.

In yet another aspect of the invention, a system comprises a business center communicating a conditional access authorization signal and an expiration signal. A display and a mobile receiver coupled to the display receive the conditional access authorization signal and the expiration signal corresponding to an expiration time. The mobile receiver enables the use of the satellite signal in response to the conditional access authorization signal. When the mobile receiver operates in a pre-determined time window before the expiration time, a warning on the display is generated.

One advantage of the system is that various technologies or multiple technologies may be used to provide the conditional access.

Other advantages and features of the present invention will become apparent when viewed in light of the detailed description of the preferred embodiment when taken in conjunction with the attached drawings and appended claims.

DETAILED DESCRIPTION

In the following figures the same reference numerals will be used for the same components. The following figures are described with respect to a mobile satellite television system. However, those skilled in the art will recognize the teachings of the present invention may be applied to various types of mobile reception including land-based type systems. The present invention may be implemented using various types of electronic devices. Thus, the present invention not only relates to mobile satellite television receiving devices, but to non-mobile applications and other electronic devices.

Figure 1:
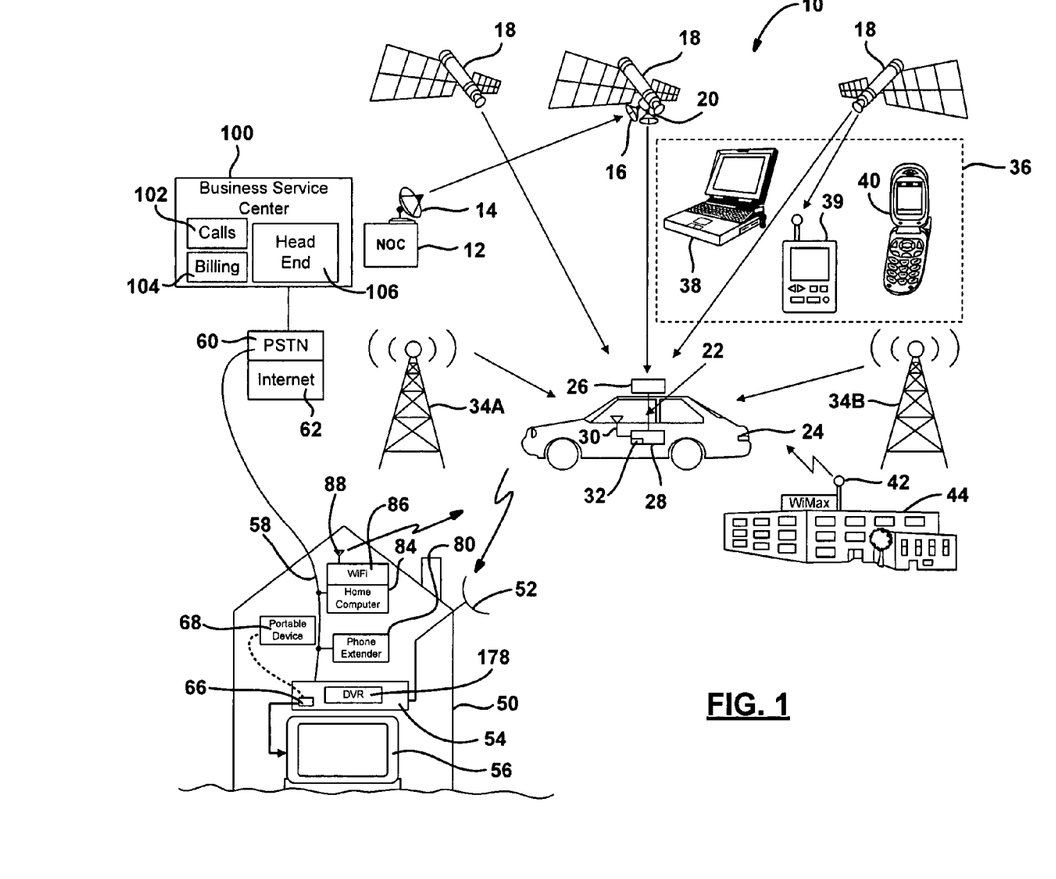
FIG. 1 is a system level view of a satellite broadcasting system according to the present invention.

Referring now to FIG. 1, a satellite television broadcasting system 10 is illustrated. The satellite television broadcasting system 10 includes a network operations center 12 that generates wireless signals through a transmitting antenna 14 which are received by a receiving antenna 16 of a satellite 18. The wireless signals, for example, may be digital. A transmitting antenna 20 generates signals directed to various receiving systems including stationary systems such as those in the home as well as mobile receiving systems 22. The wireless signals may have various types of information associated with them including location information. The wireless signals may also have various video and audio information associated therewith. As illustrated, the mobile receiving system 22 is disposed within an automotive vehicle 24. A mobile receiving antenna 26 receives the wireless signals from the satellite 18 and processes the signals in a mobile receiving unit 28. The mobile receiving unit 28 may be similar a set top box or an integrated receiver decoder and will be further described below. The mobile receiving unit 28 may also include a separate antenna 30 and a receiver 32 for receiving various content from a home-based system, as will be described below. Antenna 30 may also be used to transmit content such as a call back as well.

The system may also be used for displaying various wireless information on a personal mobile device 36 such as a dedicated satellite television device, a laptop computer 38, a personal digital assistant 39, and a cellular telephone 40. It should be noted that these devices and the automotive-based devices may also receive wireless signals having various types of information associated therewith from the cellular towers 34A and 34B. Other types of information may be broadcast from various other types of broadcasting areas such as an antenna 42 on a building 44. The building 44 may be various types of buildings such as a store and the wireless information transmitted from the antenna 42 may be advertising information. WiMax is one example of a suitable protocol. All of the wireless signals preferably include location information transmitted therewith. As will be described below, the information may be coded digitally into the signals. Thus, by reviewing the location information, signals appropriate for the location of the mobile devices may be displayed on the various devices.

A building or home 50 is illustrated having a fixed antenna 52. The fixed antenna 52 is coupled to a receiving unit 54. The receiving device 54 may also be referred to as an integrated receiver decoder. The receiving device 54 receives the satellite signals through the antenna 52 and converts them into audio and video files or streaming content to be played on television monitor 57. The receiving unit may include a digital video recorder 178. Often times, the receiving device 54 may be coupled to a telephone line 58 which in turn is coupled to the public switched telephone network (PSTN) 60 and which may also be coupled to the Internet 62. The telephone line may be used to grant conditional access and provide a means to place call-backs from the receiving device. The receiving device 54 may also include a transmitter 66 that is used to communicate with a portable device 68. As will be described below, signals received during callbacks including conditional access authorization signals from the receiving device 54 may be transferred through the transmitter 66 to the portable device 68 so that it may be used by the mobile receiving unit 28. Call-back information may be sent from the portable device in a reverse manner. The transmitter 66 may be an RF infrared, Bluetooth, WiFi, WiMax or WiMax mobile transmitter. It should be noted that the transmitter 66 may be a wireless or wired connection to the portable device 68.

As is mentioned above, the receiving device 54 may be coupled to a phone line 58. This allows another method for file transfers and call-backs such as a conditional access authorization signals from the receiving device 54 to the receiving device 28 and vice versa. A signal may be exchanged using a wireless phone extender 80. The wireless phone extender 80 generates over-the-air signals that may be received through the antenna 30 of the receiving device 28.

A home computer 84 may also be coupled to the phone wire 58. In this example, the phone wire may also be a cable wire. By coupling the home computer 84 to the receiving device 54, various actions may be controlled such as a signal or file transfer from the receiving device 54 to the mobile receiving device 28 through a particular protocol or network such as a WiFi network 86. The WiFi network 86 may generate signals through antenna 88. Various frequencies may be used in the WiFi network.

A central location such as a business service center 100 may be coupled to the public switched telephone network (PSTN) 60. The business service center 100 is typically used in a DirecTV-type system for billing, Pay-Per-View and interactive programming. The business center 100 may receive calls 102 and provide billing services 104. The business service center 100 may also act as a head end 106 coupled to network operation center 12. The business service center 100 may allow household keys to be stored on the receiving device 54. A second household key may be provided to the receiving device 28. When content is transferred from the home-based receiving device 54 to the mobile receiving device 28, the keys must match to allow playback. Typically content is encrypted with keys such that there is a strong binding between being able to play the content and having the correct matching key to decrypt the content. Thus, only mobile receivers 28 belonging to the customers of the home-based receiving device 54 are allowed playback of the particular audio and video files. The business center 100 or head end 106 may receive call-back signals allow authorizations to view pay per view, for interactive services, for gaming and the like. The business center 100 or head end 106 may also provide call in to grant authorizations and provide the system with other information signals.

Figure 2:
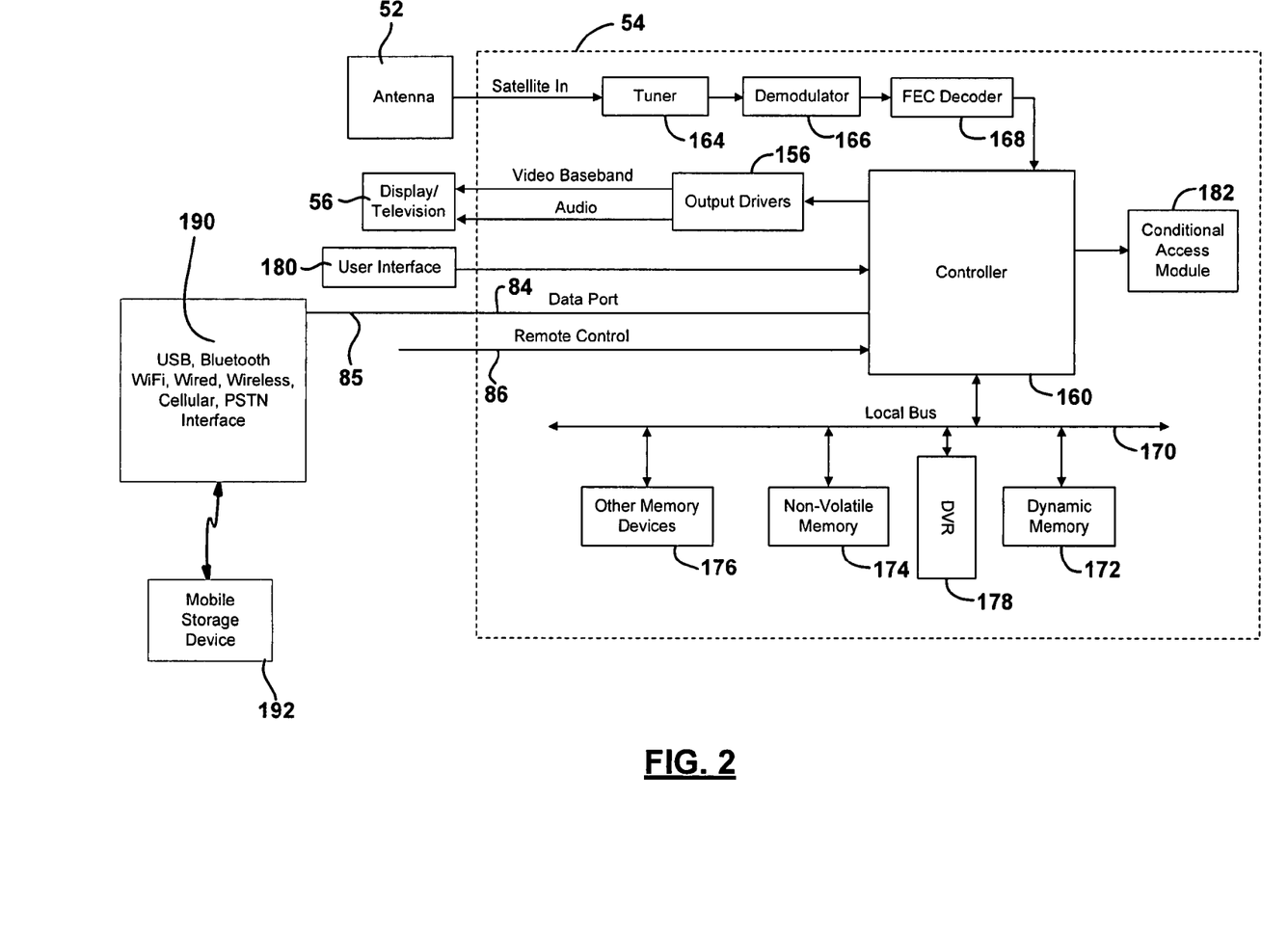
FIG. 2 is a block diagrammatic view of a home-based receiving system according to the present invention.

Referring now to FIG. 2, a receiving device 54 is illustrated in further detail. Although a particular configuration of the receiving device 54 is illustrated, it is merely representative of various electronic devices with internal controllers that may be used as a receiving device. Antenna 52 may be various types of antennas having various numbers of low noise blocks. The antenna 52 may be a single antenna used for satellite television reception. The antenna 52 may also be an electronic antenna separate or integral with the device.

A display 56 such as a television may be coupled to or in communication with the receiving device 54. The display 56 may include output drivers 156 used for generating the desired audio and video outputs suitable for the particular display 56.

A controller 160 may be a general processor such as a microprocessor. The controller 160 may be used to coordinate and control the various functions of the receiving unit 54. These functions may include a tuner 164, a demodulator 166, a forward error correction decoder 168 and any buffers and other functions. The tuner 164 receives the signal or data from the individual channel. The demodulator 166 demodulates the signal or data to form a demodulated signal or data. The decoder 168 decodes the demodulated signal to form decoded data or a decoded signal. The controller 160 may be similar to that found in current DirecTV set top boxes which employ a chip-based multifunctional controller.

The controller 160 may include or be coupled to a local bus 170. The local bus 170 may be used to couple a dynamic memory 172 such as RAM which changes often and whose contents may be lost upon the interruption of power or boot up. The bus 170 may also be coupled to a non-volatile memory 174. The non-volatile memory may be an in-circuit programmable type memory. One example of a non-volatile memory is an EEPROM. One specific type of EEPROM is flash memory. Flash memory is suitable since it is sectored into blocks of data segments that may be individually erased and rewritten.

Other memory devices 176 may also be coupled to local bus 170. The other memory devices may include other types of dynamic memory, non-volatile memory, or may include such devices such as a hard drive or a digital video recorder (DVR) 178. The display 56 may be changed under the control of controller 160 in response to the data in the dynamic memory 172 or non-volatile memory 174. The DVR 178 may store various audio and video files to be transferred.

The controller 160 may also be coupled to a user interface 180. User interface 180 may be various types of user interfaces such as a keyboard, push buttons, a touch screen, a voice activated interface, or the like. User interface 180 may be used to select a channel, select various information, change the volume, change the display appearance, or other functions. The user interface 180 is illustrated as part of the mobile receiving unit. However, should the unit be incorporated into a vehicle, the user interface 180 may be located external to the mobile receiving unit such as dial buttons, voice activated system, or the like incorporated into the vehicle and interfacing with the mobile receiving unit.

A conditional access module 182 (CAM) may also be incorporated into the mobile receiving unit. Conditional access modules (CAMs) are typically found in DirecTV units in the form of access cards. The access card 182 may provide conditional access to various channels and wireless signals generated by the system. Not having an access card or not having an up-to-date access card 182 may prevent the user from receiving or displaying various wireless content from the system.

FIG. 2 also shows an interface 190. The interface 190 may be external to the receiver 54 or internal to the receiver 54. The interface 190 may include the functions of the transmitter 66 illustrated in FIG. 1. The interface 190 is used to communicate files stored within the memory of receiver 54 to the mobile receiver 28. This may be done directly through a WiFi, WiMax, WiMax mobile, wireless, cellular or other communication directly to the mobile receiver 28.

The interface 190 may also be coupled to a mobile storage device 192. The mobile storage device 192 receives files for transfer to the mobile receiving unit 28. The mobile storage device 192 may be a simple memory that is coupled to the interface 192 through a USB-type port. Of course, other types of ports or protocols may be used to couple a memory thereto. Other types of devices include a portable hard disk drive, a portable chip-based system, or the like. The files loaded on to the mobile storage device may include the household key for security.

The interface 190 may also include the function of a wireless phone extender or a cellular phone transmitter.

Figure 3:
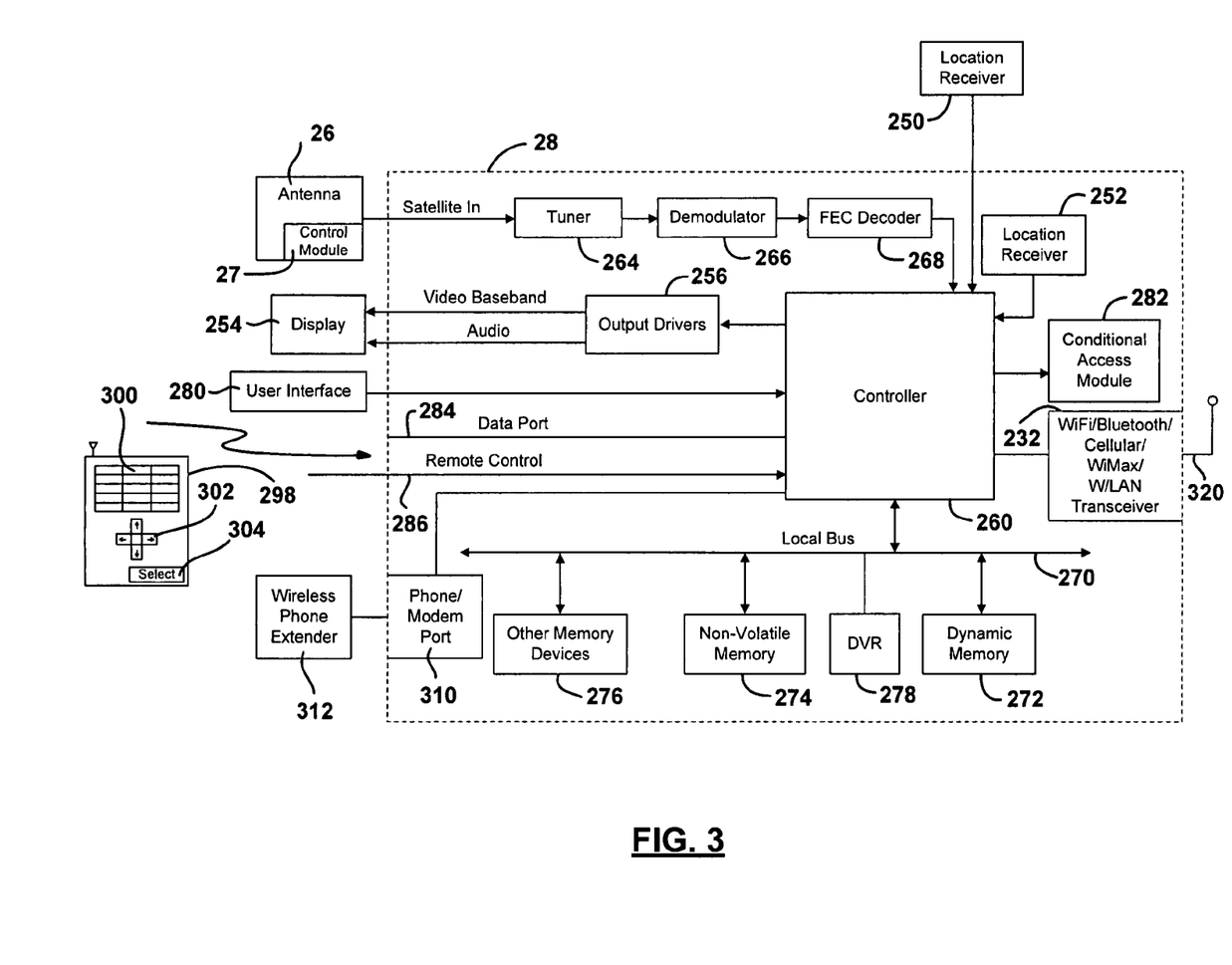
FIG. 3 is a block diagrammatic view of a mobile receiving system according to the present invention.

Referring now to FIG. 3, the mobile receiving unit 28 is illustrated in further detail. Although a particular configuration of the receiving unit 28 is illustrated, it is merely representative of various electronic devices with internal controllers. Antenna 26 may be various types of antennas including a rotating antenna which is used to track the relative movement of the satellite or other transponding device with respect to the vehicle. The antenna 26 may be a single antenna used for satellite television reception, or a number of antennas such as one for receiving television signals and one coupled to a location receiver 250 such as GPS receiver. The antenna 26 may also be an electronic antenna such as a phased array or a panel antenna. The antenna 26 may include an internal controller 27 that controls the operation of the antenna 26.

The mobile receiver unit 28 may be coupled to antenna 26 with a two-way communication channel such as a wire or a wireless system. The mobile receiving unit 28 may also include a location receiver 252 integrated therein. The location receiver 252 may be a GPS receiver. In a preferred embodiment, only one location receiver 250, 252 may be provided in the system. However, the location receiver 250, 252 may be part of the vehicle 24 or may be part of the mobile receiving system 22, 36. The controller 260 may be coupled directly to location receiver 252 and/or location receiver 250. The mobile receiving unit 28 includes a display 254. The display 254 may be incorporated into the device 28 or within the vehicle 24. The display 254 may include output drivers 256 used for generating the desired audio and video outputs suitable for the particular display 254.

A controller 260 may be a general processor such as a microprocessor. The controller 260 may be used to coordinate and control the various functions of the receiving unit 28. These functions may include a tuner 264, a demodulator 266, a forward error correction decoder 268 and any buffers and other functions. The tuner 264 receives the signal or data from the individual channel. The demodulator 266 demodulates the signal or data to form a demodulated signal or data. The decoder 268 decodes the demodulated signal to form decoded data or a decoded signal. The controller 260 may be similar to that found in current DirecTV set top boxes that employ a chip-based multifunctional controller.

The controller 260 may include or be coupled to a local bus 70. The local bus 270 may be used to couple a dynamic memory 272 such as RAM that changes often and whose contents may be lost upon the interruption of power or boot up. The bus 270 may also be coupled to a non-volatile memory 274. The non-volatile memory may be an in-circuit programmable type memory. One example of a non-volatile memory is an EEPROM. One specific type of EEPROM is flash memory. Flash memory is suitable since it is sectored into blocks of data segments that may be individually erased and rewritten.

Other memory devices 276 may also be coupled to local bus 270. The other memory devices may include other types of dynamic memory, non-volatile memory, or may include such devices such as a hard disc or a digital video recorder 278. The display 254 may be changed under the control of controller 260 in response to the data in the dynamic memory 272, non-volatile memory 274 or a DVR 278.

The controller 260 may also be coupled to a user interface 280. User interface 280 may be various types of user interfaces such as a keyboard, push buttons, a touch screen, a voice activated interface, or the like. User interface 280 may be used to select a channel, select various information, change the volume, change the display appearance, or other functions. The user interface 280 is illustrated as part of the mobile receiving unit. However, should the unit be incorporated into a vehicle, the user interface 280 may be located external to the mobile receiving unit such as dial buttons, voice activated system, or the like incorporated into the vehicle and interfacing with the mobile receiving unit.

One example of a user interface 280 is a remote control device 298 having a key pad 300, an arrow key pad 302, and a select button 304. Inputs to the receiver 28 may be provided by the remote control device 298 or through another type of user interface 280.

A conditional access module 282 (CAM) may also be incorporated into the mobile receiving unit. Conditional access modules (CAMs) are typically found in DirecTV units in the form of access cards. The access card 282 may provide conditional access to various channels and wireless signals generated by the system. Not having an access card or not having an up-to-date access card may prevent the user from receiving or displaying various wireless content from the system. The conditional access card 282 may require a conditional access authorization signal periodically to allow the satellite signals to be used or played back.

The controller 260 may be coupled to a data port 284 that is used to send or receive data and a remote control input 286 for receiving data from a wired or wireless remote control device.

Controller 260 may be coupled to a wireless or wired modem port 310. The wireless or wired phone/modem port may be coupled to a wireless phone extender 312. The wireless phone extender 312 is used to communicate with the interface 190 in the home-based receiver unit 54.

Controller 260 may also be coupled to an interface 232 that may include an antenna 320. The interface 232 may include a WiFi, WiMax, Bluetooth, cellular, wireless LAN, or the like. Signals and files received through the interface 32 may be stored on the DVR 278 for eventual playback and display on the display 254.

Figure 4:
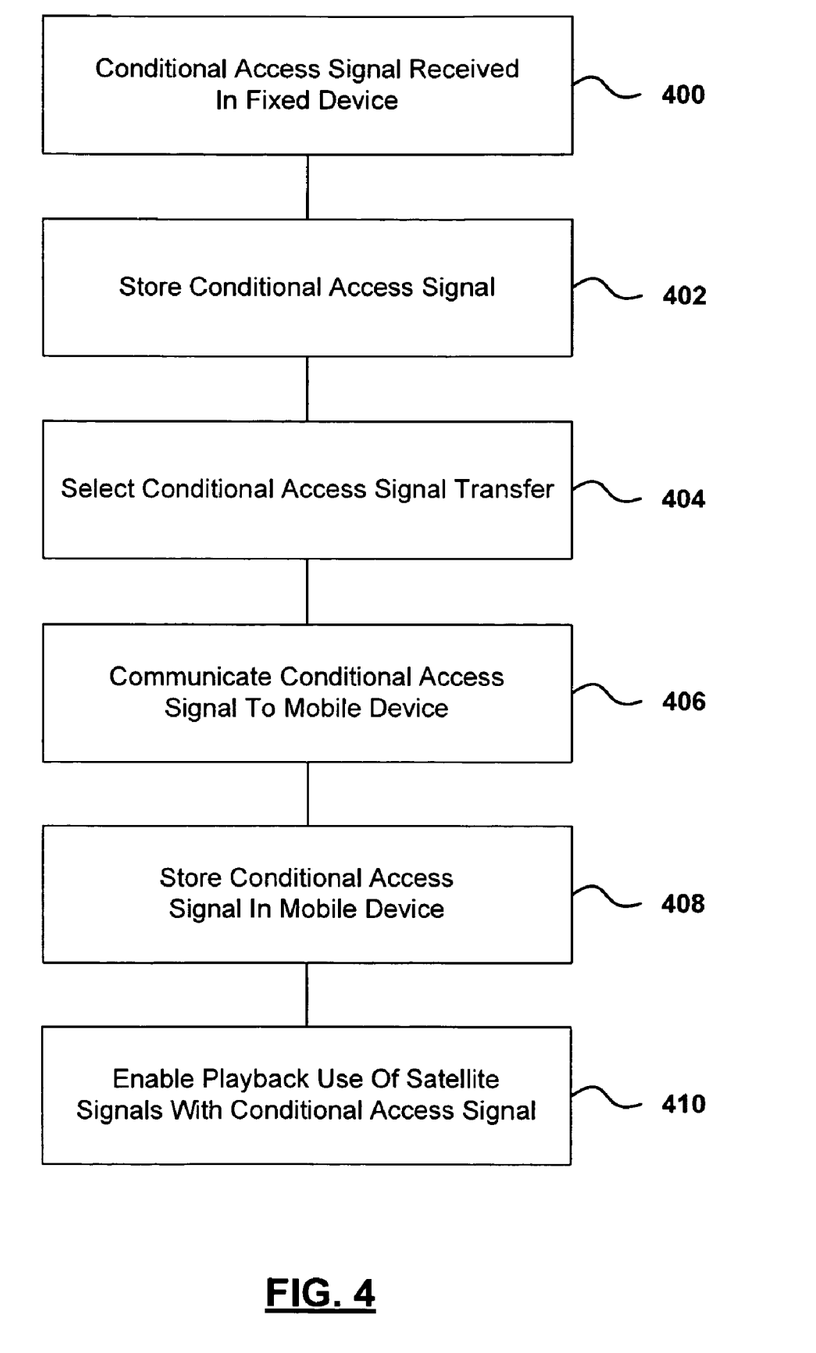
FIG. 4 is a flow chart illustrating one method for operating the present invention.

Referring now to FIG. 4, a method of granting conditional access is set forth. In step 400, a conditional access authorization signals having data therein is received in a home or fixed receiving device 54.

In step 402, conditional access authorization signals from are stored on a first receiving device such as a home-based receiving device.

A conditional access authorization signal may be transferred by selecting from a menu or the like in step 404. The menu may, for example, be an on-screen-type menu listing the conditional access authorization signal to transfer. This could also be an automated process that is periodically performed. Upon selection by a user interface, the conditional access authorization signal may be communicated to the mobile receiving device in step 406. The conditional access authorization signal may be communicated in a various number of manners including using an intermediate mobile storage device 192 illustrated in FIG. 2. Various types of devices may be used for the transfer including wired and non-wired transfers through an interface. For a mobile storage device 192, a USB connection may be used. Wireless transfer may include a Bluetooth, WiFi, WiMax, WiMax mobile, wired, wireless, cellular phone or wireless phone. Of course, the wireless methods for transferring may include wirelessly transferring files to the mobile storage device 192.

Communicating the conditional access authorization signal in step 406 may also include storing the signal in a memory in the mobile receiving device.

In step 408, the conditional access authorization signal is stored in the mobile receiving/playback device. In step 410 a satellite signal is received and played or otherwise used in the mobile receiving device with the proper conditional access authorization signal. Playback may include using a display such as a television or an audio system in a vehicle. Step 410 may also include comparing authorizations or a household key to the stored household key. As mentioned above, the keys are used to encrypt and decrypt the content. Thus, playback or other use of the satellite signals may be disabled if the household key or the conditional access authorization signals do not match the household key.

The above method may also be used for any signal sent to the receiver, not just for conditional access authorization signals.

Figure 5:
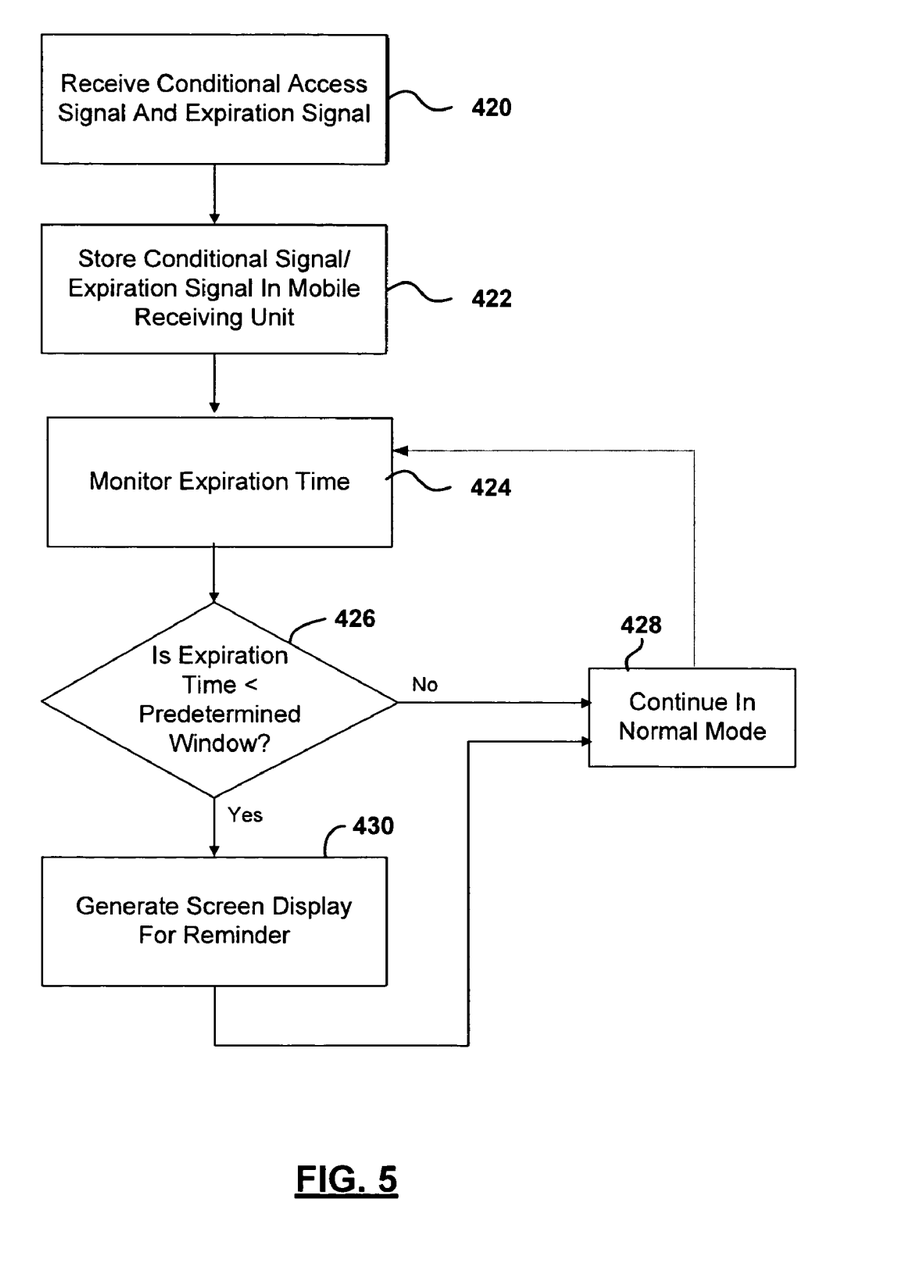
FIG. 5 is a flow chart illustrating a second method for operating the present invention.

Referring now to FIG. 5, a method of operating a mobile receiving device is set forth. In step 420, a conditional access authorization signal and an expiration signal are received at the mobile unit. The expiration signal may include a date and time of expiration. In step 422, the conditional access authorization signal and the expiration signal are stored in the mobile unit and stored in a memory within the mobile unit. Of course, those skilled in the art will recognize that the memory may be housed within the mobile unit or physically housed on a conditional access card. In step 424, as the mobile receiving unit operates, the current time is compared to the expiration time corresponding to the expiration signal that is stored in the memory. In step 426, if the current time is less than a pre-determined window from an expiration time, step 428 is performed in which the operation of the mobile receiving unit is performed in a normal mode. In step 426, if the current time is within or less than the pre-determined window, in step 430, a screen display reminder, is generated. The screen display may also include an audible warning. The screen display generates a display that corresponds to a message indicating that reauthorization is required within a pre-determined amount of time.

Figure 6:
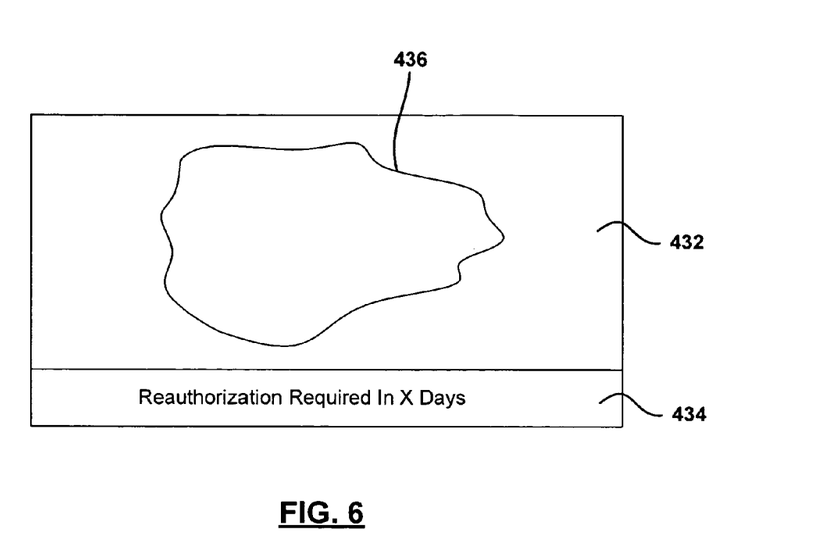
FIG. 6 is a front view of a screen display according to one aspect of the disclosure.

Referring now to FIG. 6, one example of a screen display 432 having a video image 436 is illustrated. Screen display 432 includes a banner 434 across the bottom thereof. In FIG. 6, the banner reads reauthorization required in X days. The X may correspond to a various number of days or other time period before the authorization expires. Various other methods for providing a screen display may include providing a side banner, a top banner or a full-screen display. An audible warning only or audible and video warning may be provided. It is envisioned that the reauthorization banner may be displayed for a pre-determined amount of time and normal screen operation will continue after that amount of time has expired. In addition, the subscriber may be allowed to clear the banner.

Figure 7:
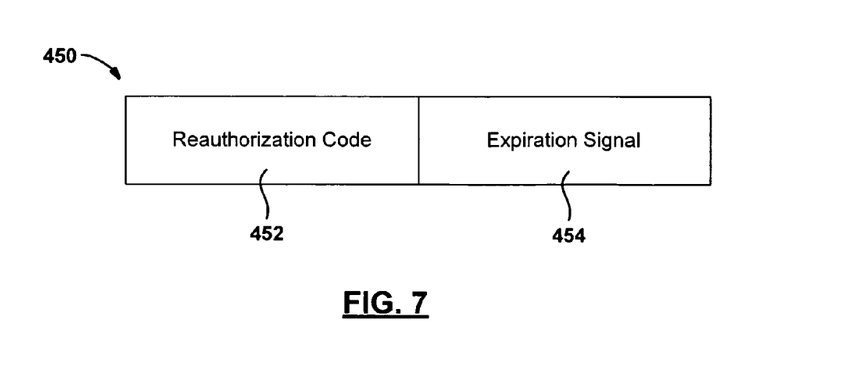
FIG. 7 is a diagram of a reauthorization and expiration signal according to one embodiment of the invention.

Referring now to FIG. 7, an example of a reauthorization signal 450 is illustrated. The reauthorization signal 450 may include a reauthorization code 452 that is stored in the mobile receiving device. An expiration signal 454 having an expiration time may also be generated with the reauthorization code 452. The expiration signal 454 is also stored within the mobile receiving device.

Figure 8:
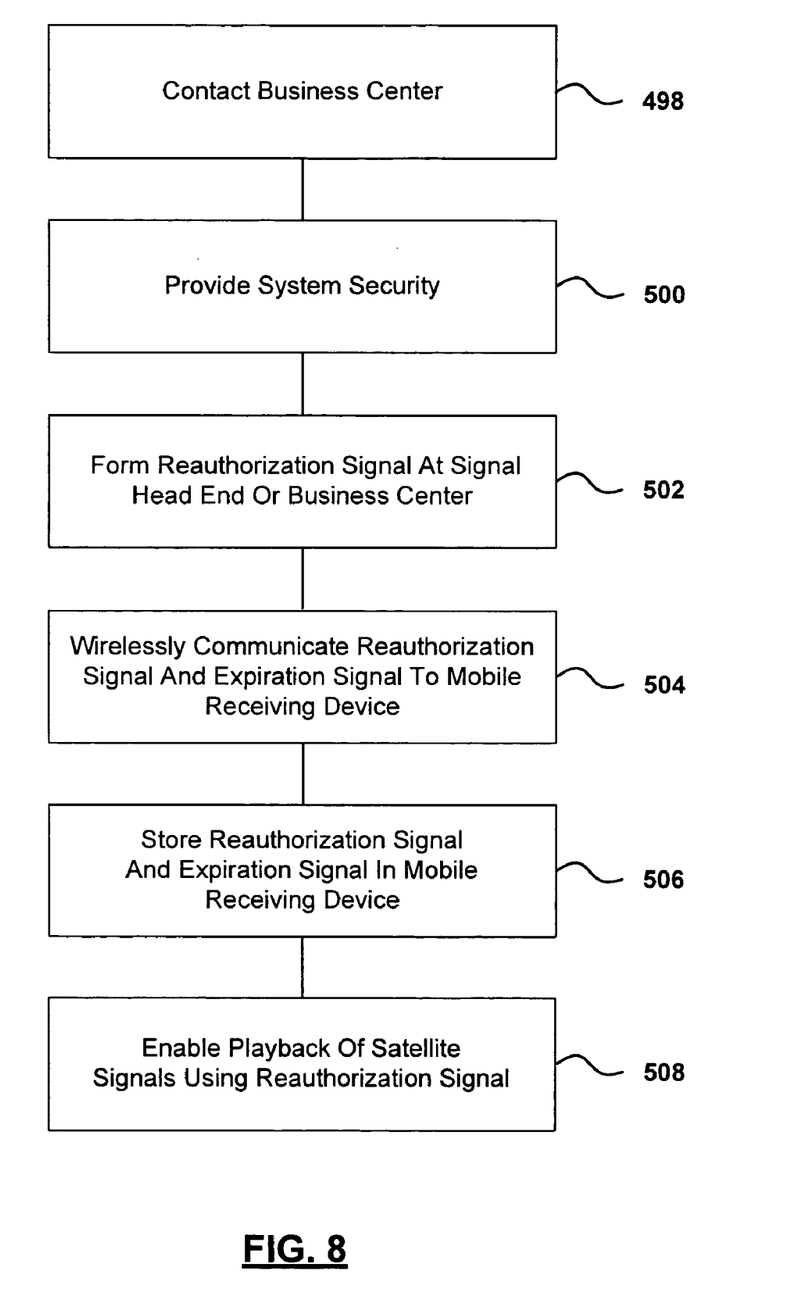
FIG. 8 is a flow chart illustrating a third method for operating the present invention.

Referring now to FIG. 8, once the reauthorization banner is communicated to the system user, the user contacts the business center in step 498. In step 500, the user provides the business center with system security, such as passwords, authorization code, or other identifying information. It is envisioned that this process may take place using a voice prompt phone system, the internet or interactivity through a set top box located within the user's home. Calling an operator at a business center may also be used, where the operator enters the identifying data for the customer. It should be noted that a reauthorization signal is a conditional access authorization signal, just not the first conditional access authorization signal. In step 502, the reauthorization signal and expiration signal is formed at the head end or business center. In step 504, the reauthorization signal and the expiration signal is wirelessly communicated to the mobile receiving device. The reauthorization signal may be communicated directly from the head end using the various wireless technology described above. In step 506, the reauthorization signal and the expiration signal are stored in the mobile receiving device. In step 508, the playback of satellite signals is enabled using the reauthorization signal and the expiration signal.

As mentioned above, the method set forth in FIG. 5 may also be used for various other types of call back signals. The wireless communication may take place using a wireless network, a WiFi network, a wireless phone extender, cellular phone network, or the like.

While particular embodiments of the invention have been shown and described, numerous variations and alternate embodiments will occur to those skilled in the art. Accordingly, it is intended that the invention be limited only in terms of the appended claims.

What is claimed is:

1. A method comprising:
    communicating a conditional access authorization signal and an expiration signal to a mobile satellite receiver;
    storing the conditional access authorization signal and the expiration signal in the mobile satellite receiver;
    enabling use of satellite signals by the mobile satellite receiver in response to the conditional access authorization signal;
    when a current time is within a time window from an expiration time determined from the expiration signal, generating a screen display corresponding to a reauthorization warning;
    contacting a business center;
    providing identifying information to the business center;
    communicating a reauthorization signal and a second expiration signal to the mobile satellite receiver;
    storing the reauthorization signal and the second expiration signal in the mobile satellite receiver; and
    enabling use of the satellite signals by the mobile satellite receiver in response to the reauthorization signal and the second expiration signal.

2. A method as in claim 1 wherein communicating comprises communicating the reauthorization signal and the second expiration signal through a satellite.

3. A method as in claim 1 wherein communicating comprises wirelessly communicating the reauthorization signal and the second expiration signal through a satellite.

4. A method as in claim 3 wherein wirelessly communicating the reauthorization signal and the second expiration signal comprises communicating the reauthorization signal and the second expiration signal through a wireless network.

5. A method as in claim 3 wherein wirelessly communicating the conditional access authorization signal comprises communicating the reauthorization signal and the second expiration signal through a WiFi network.

6. A method as in claim 3 wherein wirelessly communicating the reauthorization signal and the second expiration signal comprises communicating the reauthorization signal and the second expiration signal through an extender of a wireless phone network.

7. A method as in claim 3 wherein wirelessly communicating the reauthorization signal and the second expiration signal comprises communicating the reauthorization signal and the second expiration signal through a cellular phone network.

8. A method as in claim 3 wherein communicating a reauthorization signal and a second expiration signal comprises storing the reauthorization signal and the second expiration signal on a memory device and further comprising coupling the memory device to the mobile receiver.

9. A method as in claim 1 wherein the mobile satellite receiver comprises a mobile integrated receiver decoder.

10. A method as in claim 1 further comprising generating the conditional access authorization signal and the expiration signal at a head end.

* * * * *